US008627451B2

(12) United States Patent
Walsh et al.

(10) Patent No.: US 8,627,451 B2
(45) Date of Patent: Jan. 7, 2014

(54) SYSTEMS AND METHODS FOR PROVIDING AN ISOLATED EXECUTION ENVIRONMENT FOR ACCESSING UNTRUSTED CONTENT

(75) Inventors: Daniel J. Walsh, Marlborough, MA (US); Eric Lynn Paris, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 740 days.

(21) Appl. No.: 12/545,500

(22) Filed: Aug. 21, 2009

(65) Prior Publication Data

US 2011/0047613 A1    Feb. 24, 2011

(51) Int. Cl.
*G06F 21/00*    (2013.01)

(52) U.S. Cl.
USPC .............. 726/16; 726/17; 726/18; 726/19; 713/164; 713/189; 718/100; 718/101; 718/102; 718/103; 718/104; 718/105; 718/106; 718/107; 718/108

(58) Field of Classification Search
USPC ......... 726/16, 17–20; 713/164, 189; 718/100, 718/108
See application file for complete search history.

(56) References Cited

U.S. PATENT DOCUMENTS

| | | | |
|---|---|---|---|
| 6,446,109 B2 | 9/2002 | Gupta | |
| 7,246,374 B1 * | 7/2007 | Simon et al. | 726/16 |
| 7,340,723 B2 | 3/2008 | Antonov et al. | |
| 7,380,136 B2 * | 5/2008 | Zimmer et al. | 713/193 |
| 7,383,327 B1 | 6/2008 | Tormasov et al. | |
| 7,447,896 B2 | 11/2008 | Smith et al. | |
| 7,461,144 B1 * | 12/2008 | Beloussov et al. | 709/223 |
| 7,496,576 B2 | 2/2009 | Bernabeu-Auban et al. | |
| 7,526,774 B1 * | 4/2009 | Beck et al. | 719/320 |
| 7,562,220 B2 | 7/2009 | Frank et al. | |
| 7,698,400 B1 * | 4/2010 | Beloussov et al. | 709/223 |
| 7,886,353 B2 * | 2/2011 | Avraham et al. | 726/14 |
| 7,908,653 B2 | 3/2011 | Brickell et al. | |
| 8,312,459 B2 | 11/2012 | Smith et al. | |
| 2002/0161869 A1 | 10/2002 | Griffin et al. | |
| 2002/0184520 A1 | 12/2002 | Bush et al. | |
| 2003/0172109 A1 * | 9/2003 | Dalton et al. | 709/203 |
| 2006/0048099 A1 | 3/2006 | Templin et al. | |
| 2007/0006321 A1 * | 1/2007 | Bantz et al. | 726/27 |
| 2007/0050766 A1 | 3/2007 | Pomerantz | |
| 2007/0226773 A1 | 9/2007 | Pouliot | |
| 2008/0016339 A1 * | 1/2008 | Shukla | 713/164 |
| 2008/0235806 A1 * | 9/2008 | Bantz et al. | 726/27 |
| 2009/0216768 A1 | 8/2009 | Zwilling et al. | |
| 2009/0259993 A1 | 10/2009 | Konduri et al. | |

(Continued)

OTHER PUBLICATIONS

Yu et al—"A Feather-Weight Virtual Machine for Windows Applications", Jul. 2007.*

(Continued)

*Primary Examiner* — Andy Rao
*Assistant Examiner* — Shan Elahi
(74) *Attorney, Agent, or Firm* — Lowenstein Sandler LLP (57) ABSTRACT

A sandbox tool can cooperate with components of a secure operating system to create an isolated execution environment for accessing untrusted content without exposing other processes and resources of the computing system to the untrusted content. The sandbox tool can allocate resources (storage space, memory, etc) of the computing system, which are necessary to access the untrusted content, to the isolated execution environment, and apply security polices of the operating system to the isolated execution environment such that untrusted content running in the isolated execution environment can only access the resources allocated to the isolated execution environment.

25 Claims, 7 Drawing Sheets

(56) References Cited

U.S. PATENT DOCUMENTS

| | | | |
|---|---|---|---|
| 2009/0276771 A1* | 11/2009 | Nickolov et al. | 717/177 |
| 2010/0058016 A1 | 3/2010 | Nikara et al. | |
| 2010/0082926 A1 | 4/2010 | Sahita et al. | |
| 2010/0192224 A1 | 7/2010 | Ferri et al. | |
| 2010/0274910 A1 | 10/2010 | Ghanaie-Sichanie et al. | |
| 2011/0067105 A1 | 3/2011 | Wolfe et al. | |
| 2011/0138473 A1 | 6/2011 | Yee et al. | |
| 2011/0138474 A1 | 6/2011 | Yee et al. | |
| 2011/0154431 A1* | 6/2011 | Walsh | 726/1 |
| 2011/0296487 A1 | 12/2011 | Walsh | |
| 2011/0296529 A1 | 12/2011 | Bhanoo et al. | |
| 2012/0159127 A1 | 6/2012 | Spradlin | |
| 2012/0179587 A1 | 7/2012 | Hill et al. | |
| 2012/0216285 A1 | 8/2012 | Walsh | |

OTHER PUBLICATIONS

Walsh et al., "Systems and Methods for Providing Multiple Isolated Execution Environments for Securely Accessing Untrusted Content", U.S. Appl. No. 12/640,657, filed Dec. 17, 2009.

USPTO, Office Action for U.S. Appl. No. 12/640,657 mailed Jun. 27, 2012.

USPTO, Final Office Action for U.S. Appl. No. 12/640,657 mailed Dec. 3, 2012.

USPTO, Advisory Action for U.S. Appl. No. 12/640,657 mailed Feb. 11, 2013.

USPTO, Office Action for U.S. Appl. No. 12/789,554 mailed on Aug. 16, 2012.

USPTO, Final Office Action for U.S. Appl. No. 12/789,554 mailed Mar. 11, 2013.

USPTO, Office Action for U.S. Appl. No. 13/029,702 mailed Nov. 6, 2012.

USPTO, Office Action for U.S. Appl. No. 13/029,702 mailed Mar. 14, 2013.

Daniel J. Walsh, Systems and Methods for Providing an Fully Functional Isolated Execution Environment for Accessing Content, U.S. Appl. No. 12/789,554, filed May 28, 2010.

Daniel J. Walsh, Systems and Methods for Inhibiting Denial-Of-Service Attacks Using Group Controls, U.S. Appl. No. 13/029,702, filed Feb. 17, 2011.

* cited by examiner

SYSTEMS AND METHODS FOR PROVIDING AN ISOLATED EXECUTION ENVIRONMENT FOR ACCESSING UNTRUSTED CONTENT

FIELD

This invention relates generally to computer security.

DESCRIPTION OF THE RELATED ART

In today's distributed computing environments, security is of the utmost importance. Due to the rise of wide-area public networks, users have unlimited access to content, e.g. data, files, applications, programs, etc., from a variety of sources. Often, the users are unaware of the origin of the content available in the public networks. Malicious entities utilize this ease of accessibility and anonymity to attack the users. For example, the malicious entities can plant viruses, Trojans, or other malicious agents in publicly available content in order to attack the users' computing systems and steal sensitive information from the users. As such, the users must treat content from unknown sources as untrusted and possibly dangerous.

Typically, to prevent attacks, the users utilize filtering programs, anti-virus programs, etc. in order to identify and block known dangerous content. These programs, however, suffer from several weaknesses. In order to properly identify and block the dangerous content, the filtering and anti-virus programs must typically be configured with the identity of the source of known dangerous content. As such, the filtering and anti-virus programs lack the ability to stop previously unknown and emerging threats. Likewise, the filtering and anti-virus programs are themselves subject to attack. Many types of dangerous content utilize weaknesses in the filtering and anti-virus programs to attack the users' computing systems using the filtering and anti-virus programs as a vehicle for attaching the users' computing systems. As such, the users lack methods to guarantee that untrusted content does not pose a threat.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for accessing, viewing, and running untrusted content, such as data, files, programs, and applications, without exposing a computing system to untrusted content and possibly malicious content. More particularly, a "sandbox tool" can create an isolated execution environment that is isolated from other processes executing on the computing system for accessing untrusted content.

According to embodiments, the sandbox tool can be configured to cooperate with components of a secure operating system, such as security enhanced LINUX (SELinux), to create an isolated execution environment for accessing untrusted content without exposing other processes and resources of the computing system to the untrusted content. In particular, the sandbox tool can be configured to allocate resources (storage space, memory, etc) of the computing system, which are necessary to access the untrusted content, to the isolated execution environment, and apply security polices of the operating system to the isolated execution environment such that untrusted content running in the isolated execution environment can only access the resources allocated to the isolated execution environment. As such, the user can access the untrusted content without exposing the overall computing system to any possible malicious or dangerous content.

According to embodiments, to create the isolated execution environment, the sandbox tool can be configured to cooperate with the operating system to create a temporary name space for the isolated execution environment (e.g. including home directory and temporary directory). The sandbox tool can be configured to copy the untrusted content to the temporary name space and can be configured to create an execution file in the temporary name space for accessing the untrusted content such as initiating and executing applications to view data and files. Then, the sandbox tool can be configured to cooperate with the operating system to unshare any other name spaces (e.g. user name space) with the temporary name space and to mount the temporary name space over any existing name spaces so that the processes of isolated execution environment cannot access files and processes of any other name space except the temporary name space.

According to embodiments, once the temporary name space is created, the sandbox tool can be configured to associate a security context of the operating system with the isolated execution environment and apply a security label to the execution file and any other processes of the isolated execution environment. The security label can identify the security policies applied by the operating system to the isolated execution environment, thereby, defining the levels of access the untrusted content and any other processes have to the resources of the computing system.

According to embodiments, the sandbox tool can be configured to cooperate with the operating system to start a new virtual process server, such as an X Server providing an X Windows interface, for the isolated execution environment. The new virtual process server can be configured to provide a user interface to the untrusted content and other processes running in the isolated execution environment. The new virtual process server can operate within an existing virtual process server for a user execution environment but distinct from any other process servers supported by the operating system. The sandbox tool can be configured to associate the security label of the isolated execution environment with the new virtual process server so that any processes, such as the untrusted content, can only access processes and resources allowed by the security context of the isolated execution environment.

According to embodiments, once the isolated execution environment is created, the sandbox tool can initiate execution of the untrusted content in the isolated execution environment. During execution, the operating system can apply the security policies associated with the security context of the isolated execution environment. For example, the operating system can allow the new virtual process server to only access the processes and resources with the security label assigned to the isolated execution environment. Once access to or execution of the untrusted content, the sandbox tool can be configured to remove all traces of the isolated execution environment such as terminating the new process server and removing the temporary name space.

According to embodiments, when assigning the security context to the execution environment, the sandbox tool can be configured to assign different access levels to the isolated execution environment. For example, the isolated execution environment can be limited to accesses only the temporary name space created for the isolated execution environment. Likewise, the isolated execution environment can be given greater accesses such as limited network access.

By utilizing the sandbox tool, untrusted content can be accessed on a computing system without exposing the computing system to any malicious agents that may be contained in the untrusted content. As such, the untrusted content can be accessed without regard to the source of the content. Likewise, untrusted content can be accessed without the use of other security programs and applications which may be susceptible to malicious agents contained in the untrusted content.

Figure 1:
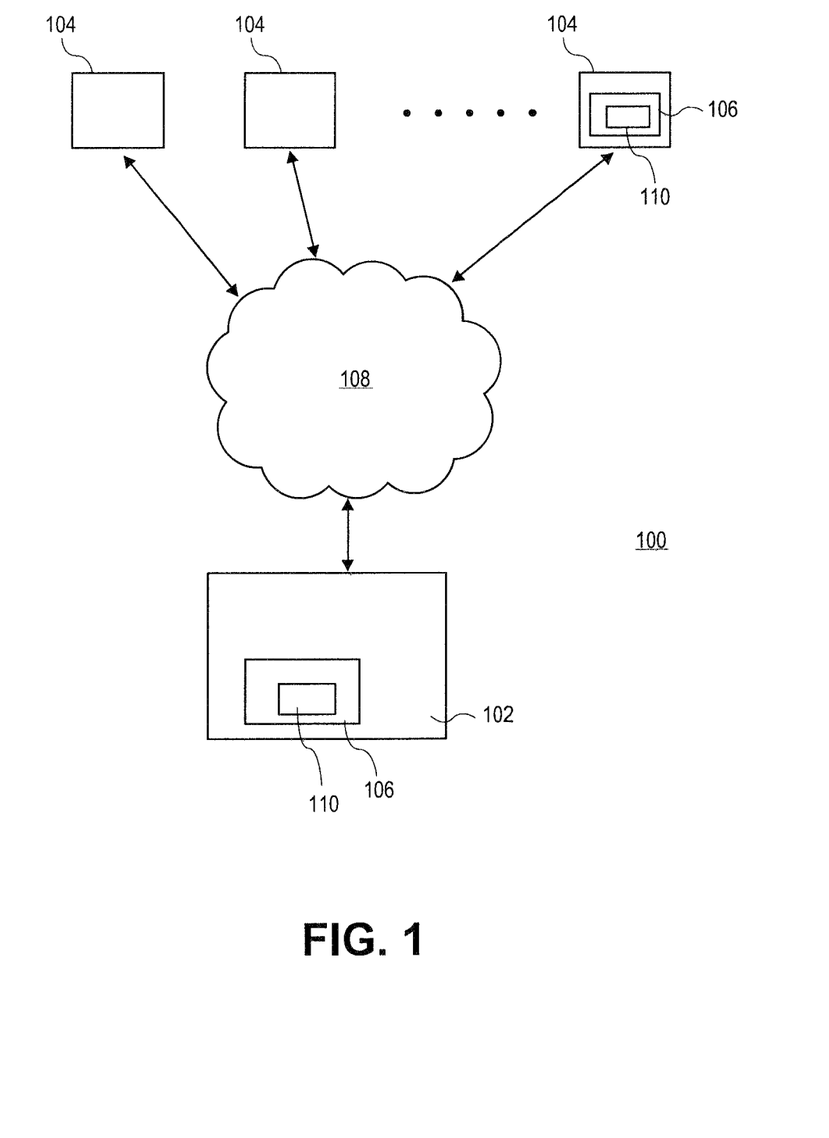
FIG. 1 illustrates a network of computing systems in which various embodiments of the present teachings can be practiced.

FIG. 1 illustrates an exemplary network 100 of computing systems, according to various embodiments. It should be readily apparent to those of ordinary skill in the art that the network 100 depicted in FIG. 1 represents a generalized schematic illustration and that other components may be added or existing components may be removed or modified. Moreover, the network 100 may be implemented using software components, hardware components, or combinations thereof.

As illustrated in FIG. 1, the network 100 can represent the systems of private entities, such as individuals, businesses, partnerships, companies, corporations, etc., and public entities, such as universities, governmental agencies, etc. The network 100 can include a number of computing systems, such as a user computing system 102 and remote computing systems 104. The computing systems, such as the user computing system 102 and remote computing systems 104, can include hardware resources, such as processors, memory, network hardware, storage devices, and the like, and software resources, such as operating systems (OS), application programs, and the like.

In embodiments, the user computer system 102 can include a secure OS 106, such as security enhanced Linux ("SELinux"), available from RED HAT, Inc. In this example, SELinux implements a monolithic kernel which is configured to provide an X-Window computing environment to the user computing system 102. SELinux is a version of Linux that integrates FLASK architectural components to provide general support for the enforcement of many kinds of mandatory security policies, including those based on the concepts of type enforcement, role-based access control ("RBAC"), and multi-level security.

In embodiments, the computing systems in environment 100 can be located at any location, whether located at single geographic location or remotely located from each other. In order to communicate and share data, the user computing system 102 and the remote computing systems 104 can be coupled to one or more networks 108. The one or more networks 108 can be any type of communications networks, whether wired or wireless, to allow the computing system to communicate, such as wide-area networks (e.g. Internet) or local-area networks.

In embodiments, a user of the user computing system 102 can utilize the computing environment of the secure OS 106 to access content on the user computing system 102. The content can include any number and type of data, applications, and programs such as word processing applications, web browser applications, file sharing applications, electronic mail (e-mail) applications, multimedia applications, chat applications, etc. Likewise, the content can include files and data utilized by the applications or accessed utilizing the applications. The content accessed on the user computing system 102 can be acquired from a variety of sources. For example, the content can be installed and copied to the user computing system 102 from media such as compact discs (CDs) and digital versatile discs (DVDs). Likewise, the content can be downloaded from one or more of the remote computing systems 104 via the network 108.

In embodiments, the content accessed on the user computing system 102 may not be secure. For example, the user computing system 102 can acquire the content from one or more of the remote computing systems 104. In this example, the user computing system 102 may not know the source of the content and cannot guarantee that the content is secure. Likewise, content installed and copied from media can be untrusted and possibly insecure. As such, the content can be deemed to be untrusted and can possibly be insecure.

In embodiments, regardless of whether the content is trusted or untrusted, the user of the user computing system 102 can desire to access the content without exposing the user computing system 102 to malicious agents (e.g. viruses, Trojans, etc.). In order to allow access of the content without exposing the user computing system 102 to malicious agents, the user computing system 102 can include a sandbox tool 110. The sandbox tool 110 can be configured to cooperate with components of the secure OS 106 to create an isolated execution environment for accessing untrusted content without exposing other processes and resources of the user computing system 102 to the untrusted content. In particular, the sandbox tool 110 can be configured to allocate resources (storage space, memory, etc) of the user computing system 102, which are necessary to access the untrusted content, to the isolated execution environment, and apply security polices of the secure OS 106 to the isolated execution environment such that untrusted content running in the isolated execution environment can only access the resources allocated to the isolated execution environment. As such, the user can access the untrusted content without exposing the user computing system 102 to any possible malicious or dangerous content.

In embodiments, the untrusted content can be applications, programs, files, and/or data. The sandbox tool 110 can be configured to create the isolated execution environment to allow the applications, programs, files, and/or data to be accessed, executed, or viewed without exposing the user computing system 102 to any possible malicious or dangerous content. For example, the applications, programs, files, and/or data can only access the resources allocated to the isolated execution environment.

In embodiments, as illustrated, the sandbox tool 110 can be implemented as part of the secure OS 106. Likewise, the sandbox tool 110 can be implemented as a standalone application that communicates with the components of the secure OS 106. In either case, the sandbox tool 110 can be written in any type of known open-source or proprietary programming language, such as C, C++, JAVA, etc.

In embodiments, the user computing system 102 can store and execute the secure operating system 106 and sandbox tool 110. Additionally, one or more of the remote computing systems 104 can store and execute the secure operating system 106 and the sandbox tool 110. As such, the user computing system 102 can access the operating system 102 and the sandbox 110 stored on the one or more remote computing system 104 via the network 108 in order to access content using a client-server model.

Figure 2:
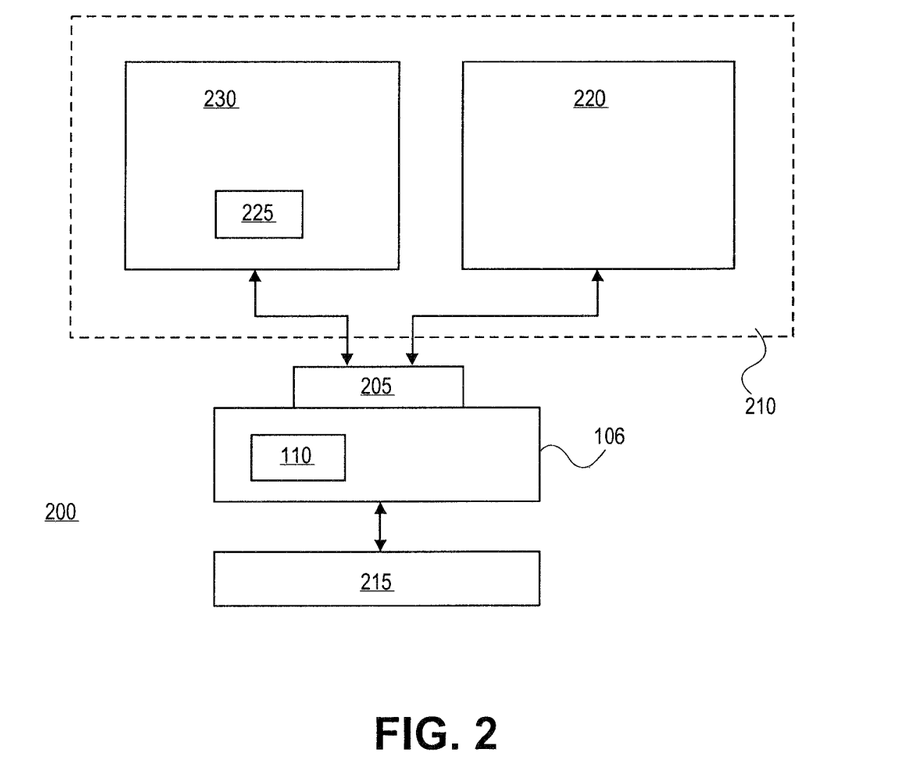
FIG. 2 illustrates an exemplary software environment for utilizing an isolated execution environment, according to various embodiments of the present teachings.

FIG. 2 illustrates an exemplary software environment 200 in accordance with various embodiments. It should be readily apparent to those of ordinary skill in the art that software environment 200 depicted in FIG. 2 represents a generalized schematic illustration and that other components may be added or existing components may be removed or modified.

As shown in FIG. 2, the software environment 200 can include the secure OS 106, such as SELinux or similar secure multi-tasking, multi-user operating system. A run-time environment (not shown) can be configured to execute on the secure OS 106. The run-time environment can provide a set of software that supports the access of content (e.g. applications, files, data, etc.). The run-time environment can also comprise an application program interface ("API") 205 and a complementary API (not shown) within an application space 210. The API 205 can be configured to provide a set of routines that the application space 210 uses to request lower-level services performed by the secure OS 106. The secure OS 106 can include a kernel (not shown) and device drivers 215. The kernel can be configured to provide secure access to the underlying hardware of the user computing system 102 (e.g. processor, memory, storage, input/output devices, network devices, etc.) through the device drivers 215.

In embodiments, during operation, the secure OS 106 can be configured to create a user execution environment 220 in the application space 210. The user execution environment 220 allows users to interact with the the user computing system 102 to access content such as run application and programs, view files, etc. The secure OS 106 can be configured to perform the necessary processes to establish the user execution environment 220 such as creating a virtual processes server (e.g. X-server) to support user interaction with the user execution environment 220, providing access to the devices drivers 215, allocating resources (e.g. user namespace such as home directory and temporary directory) to support the user execution environment 220, and the like. Likewise, the secure OS 120 can enforce security policies in the user execution environment 220 to allow/prevent access to underlying resources (network ports, file directories, memory, etc.) of the user computing system 102.

In embodiments, in order to provide access to untrusted content 225 without endangering the user computing system 102, the sandbox tool 110 can be configured to cooperate with components of a secure OS 106, to create an isolated execution environment 230 for accessing untrusted content 225 without exposing other processes such as the user execution environment 220 and resources of the user computing system 102 to the untrusted content 225. In particular, the sandbox tool 110 can be configured to allocate resources (storage space, memory, etc) of the user computing system 102, which are necessary to access the untrusted content 225, to the isolated execution environment 230, and apply security polices of the secure OS 106 to the isolated execution environment 230 such that untrusted content 225 running in the isolated execution environment 230 can only access the resources allocated to the isolated execution environment 230.

In embodiments, to create the isolated execution environment 230, the sandbox tool 110 can be configured to cooperate with the secure OS 106 to create a temporary namespace for the isolated execution environment 230 (e.g. temporary home directory and tmp directory). The sandbox tool 110 can be configured to copy (or instruct the secure OS 106 to copy) the untrusted content 225 to the temporary namespace and can be configured to create an execution file in the temporary namespace for accessing the untrusted content 225, for example, initiating and executing applications to view data and files.

In embodiments, the sandbox tool 110 can be configured to cooperate with the secure OS 106 to isolate the isolated execution environment 230 from the user execution environment 220. For example, the sandbox tool 110 can instruct the secure OS 106 to unshare any other namespaces (e.g. the user name space of the user execution environment 220) with the temporary namespace and to mount the temporary namespace over any existing namespaces so that the processes of isolated execution environment 230 cannot access files and processes of any other namespace except the temporary namespace.

In embodiments, once the temporary namespace is created, the sandbox tool 110 can be configured to cooperate with the secure OS 106 to associate a security context of the secure OS 106 with the isolated execution environment 230. For example, the sandbox tool 110 can assign (or instruct the secure OS 106 to assign) a security label to the execution file and any other processes of the isolated execution environment 230. The security label can identify the security policies applied by the secure OS 106 to the isolated execution environment, thereby, defining the levels of access the untrusted content 225 and any other processes have to the resources of the user computing system 102 via the device drivers 215. Likewise, the secure OS 106 can utilize the security label to allow processes with a particular security label (i.e. processes of a particular isolated execution environment 230) to access only processes with the same particular security label (i.e. other processes of the particular isolated execution environment 230).

In embodiments, the sandbox tool 110 can be configured to cooperate with the secure OS 106 to start a new virtual process server, such as an X Server providing an X Windows interface, for the isolated execution environment 230. The new virtual process server can be configured to provide a user interface to the untrusted content 225 and other processes running in the isolated execution environment 230. The new virtual process server can run with other virtual process servers supported by the secure OS 106, such as the virtual process server supporting the user execution environment 220. The sandbox tool 110 can be configured to associate the security label of the isolated execution environment 230 with the new virtual process server. Accordingly, the secure OS 106 can be aware of the new virtual process server and any processes utilizing the new virtual process server, such as the untrusted content 225, can only access processes and resources allowed by the security context of the isolated execution environment 230.

In embodiments, once the isolated execution environment 230 is created, the sandbox tool 110 can initiate execution of the untrusted content 225 in the isolated execution environment 230. During execution, the secure OS 106 can apply the security policies associated with the security label of the isolated execution environment 230. For example, the secure OS 106 can allow the new virtual process server to only access the processes with the same security label, and to only access the resources, for example, limit and control access to the device drivers 215, associated with the security label assigned to the isolated execution environment 230. Once the untrusted content 220 is finished executing, the sandbox tool 110 can be configured to remove (or instruct the secure OS 106 to remove) all traces of the isolated execution environment 230 such as terminating the new process server and removing the temporary namespace.

In embodiments, the sandbox tool 110 can be configured to create and/or maintain one or more isolated execution environments 230, simultaneously. The multiple isolated execution environments 230 can have the same security context, for example, the same levels of access to the resources of the user computing system 102. In order to keep the multiple isolated execution environments 230 isolated from each other, the sandbox tool 110 can be configured to assign (or instruct the secure OS 106 to assign) different security labels, for example random security labels, to each of the multiple isolated execution environments 230. As such, the sandbox tool 110 can create one or more isolated execution environments 230 which co-exist and have the same level of access, but remain isolated from each other.

Figure 3:
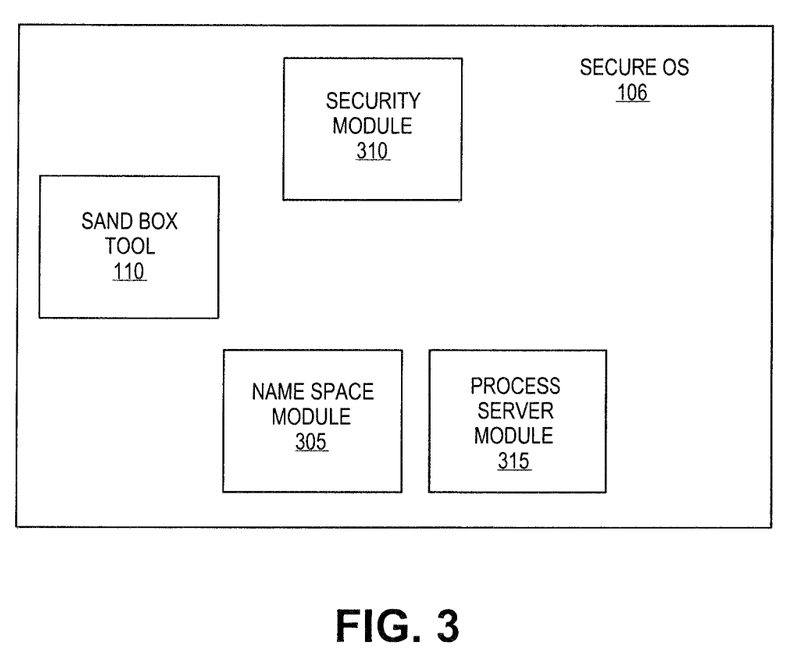
FIG. 3 illustrates components of an exemplary secure operating system including a sandbox tool, according to various embodiments.

FIG. 3 shows an exemplary block diagram of the secure OS 106 including the sandbox tool 110 according to various embodiments. It should be readily apparent to those of ordinary skill in the art that the secure OS 106 depicted in FIG. 3 represents a generalized schematic illustration and that other components may be added or existing components can be removed or modified. Likewise, while FIG. 3 illustrates the sandbox tool 110 as part of the secure OS 106, those of ordinary skill in the art will realize that the sandbox tool 110 can be implemented as a separate and standalone program or application that can communicate and cooperate with the secure OS 106, and the sandbox tool 110 can incorporate one or more of the components of the secure OS 106.

As shown in FIG. 3, the secure OS 106 can include a namespace module 305, a security module 310, a process server module 315. These components can be incorporated into the secure OS 106 and/or the sandbox tool 110 to implement the functionality of the isolated execution environment 230 as previously described and described in greater detail below.

In embodiments, the namespace module 305 can be configured generate and maintain the namespaces that support the user execution environment 220 and the isolated execution environment 230. More particularly, the namespace module 305 can create directories including a home directory (Homedir), file directory(/tmp) and /var/tmp for the user execution environment 220 and, when necessary, create a temporary home directory and tmp directory for the isolated execution environment 230. Likewise, the namespace module 305 can be configured to remove the namespace of the isolated execution environment 230 once the user computing system 102 has completed accessing the untrusted content 225.

In embodiments, the security module 310 can be configured to maintain and enforce the security policies of the secure operating system 106. The security policies can define the various access levels of the processes running on the user computing system 102. For example, the security policies can define the various resources that are accessible at different access levels such as full or limited network access, full or limited memory access, full or limited storage access, and the like. To enforce the security policies, the security module 310 can be configured to apply a security context to different processes running on the user computing system 102 by assigning a security label, for example MCS label in SELinux, to different processes. The security label is associated with the secure OS 106 and can identify what security policies the security module 310 should apply to the processes ruing on the user computer system 102. When the processes, which are assigned a particular security label, request access to resources of the user computing system 102, the secure OS 106 can read the security label and apply the associated security policy to the processes, thereby restricting access of the processes to the security context. For example, the security module 310 can allow processes with a particular security label to only access the processes with the same security label, and to only access the resources, for example, limit and control access to the device drivers 215, defined by the security policies associated with the particular security label.

In embodiments, the process server module 315 can be configured to implement virtual processes servers for the processes rung on the user computing system 102 such as the user execution environment 220 and the isolated execution environment 230. For example, if secure OS 106 is SELinux, the process server module 310 can be configured to implement one or more X Servers which provide X Windows interfaces that allow the user of the user computing system 102 to interact with the processes running on the user computing system 102.

In embodiments, the sandbox tool 110 can be configured to include the necessary logic, instructions, and commands to implement the methods and processes of creating the isolated execution environment 230 as described above and below. The sandbox tool 110 can be configured to cooperate with the secure OS 106 to create the execution environment 230 (e.g. creating/removing namespaces, isolating namespaces, copying content, applying security contexts, accessing the untrusted content 225, and the like).

In embodiments, the sandbox tool 110 can be configured to apply various security contexts to the isolated execution environment 230. For example, the sandbox tool 110 can define various security contexts for the isolated execution environment 230 from completely isolated (access to resources only necessary to access the untrusted content 225) to limited access (limited access to memory, network, storage, etc.). In the case of limited access, the sandbox tool 110 can be configured to apply security contexts that restrict access to a particular type of resource (e.g. network, memory, storage, processors) and/or that limits access to the different types of resources (e.g. certain network ports, certain memory ranges, certain storage location, certain processors). To apply the security context, the sandbox tool 110 can apply a security label to the isolated execution environment 230 and the processes of the isolated execution environment 230 and/or can instruct the security module 310 to apply a security label to the execution environment 230 and the processes of the isolated execution environment 230.

In embodiments, the sandbox tool 110 can be configured to create and/or maintain one or more isolated execution environments 230, simultaneously. The multiple isolated execution environments 230 can have the same security context, for example, the same levels of access to the resources of the user computing system 102. In order to keep the multiple isolated execution environments 230 isolated from each other, the sandbox tool 110 can be configured to assign (or instruct the security module 310 to assign) different security labels, for example random security labels, to each of the multiple isolated execution environments 230. As such, the sandbox tool 110 can create one or more isolated execution environments 230 which co-exist and have the same level of access, but remain isolated from each other.

In embodiments, the sandbox tool 110 can be preconfigured with the security context to apply to the isolated execution environment 230. For example, the sandbox tool 110 can be preconfigured to apply a completely isolated context or limited access context to the isolated execution environment 230. Likewise, the sandbox tool 110 can be preconfigured to apply a security context based on the type of untrusted content 225 accessed in the isolated execution environment 230. For instance, the sandbox tool 110 can be preconfigured to apply a limited network access (e.g. access to only specific network ports) security context to any untrusted content that requires network access.

In embodiments, the sandbox tool 110 can be configured to allow the user to select the security context for the isolated execution environment 230. For example, the sandbox tool 110 can allow the user to select the preconfigured security context to apply to the isolated execution environment. Likewise, the sandbox tool 110 can allow the user to select the security context each time an isolated execution environment 230 is created. As such, the sandbox tool 110 can be configured to include the necessary logic, instructions, and commands to generate graphical user interfaces (GUIs) that allow a user select a security context to apply to the isolated execution environment 230.

In embodiments, in order to initiate access in the isolated execution environment 230, the sandbox tool 110 can be configured to allow a user to request the access of untrusted content 225 in an isolated execution environment 230. As such, the sandbox tool 110 can be configured to include the necessary logic, instructions, and commands to generate GUIs that allow a user to start the sandbox tool 110, select untrusted content 225 to access in the isolated execution environment 230, and select a security context to apply to the isolated execution environment 230. For instance, the sandbox tool 110 can be directly accessed in order to initiate access of the untrusted content 225 in the isolated execution environment 230. Additionally, the sandbox tool 110 can be linked to other applications and programs (e.g. web browsers) to allow access of the untrusted content 225 in the isolated execution environment 230.

In embodiments, additionally, in order to initiate access in the isolated execution environment, the sandbox tool 110 can be configured to automatically initiate access of the untrusted content in the isolated execution environment 230. For example, upon the access of certain untrusted content, such as particular files or applications, the sandbox tool 110 can automatically initiate access of the untrusted content in the isolated execution environment 230. As such, the sandbox tool 110 can be configured to include the necessary logic, instructions, and commands to GUIs that allow selection of types of untrusted content 225 which will automatically be accessed in the isolated execution environment 230 and the security context to be applied to the isolated execution environment 230.

Figure 4:
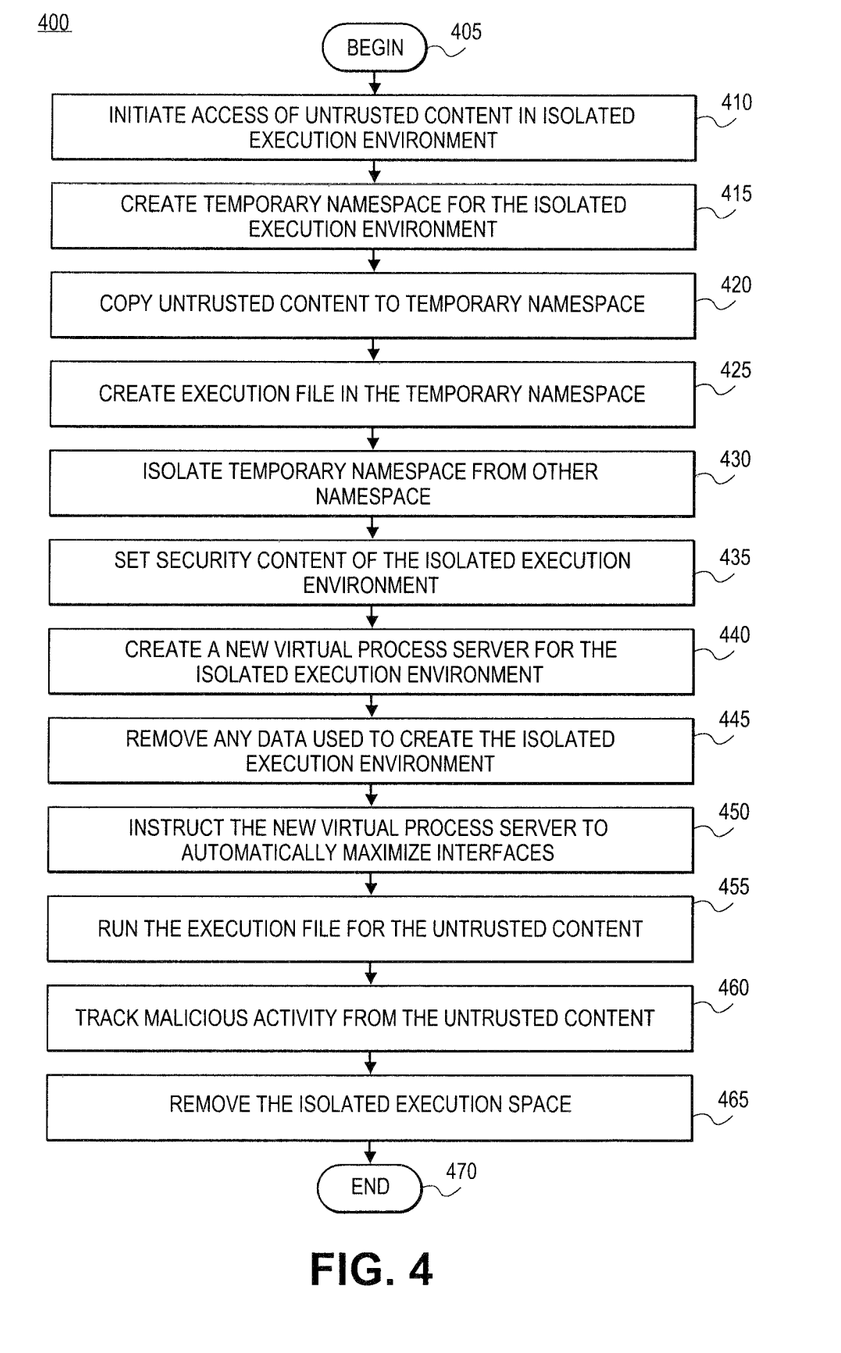
FIG. 4 illustrates an exemplary process for accessing untrusted content in the isolated execution environment, according to various embodiments.

FIG. 4 depicts an exemplary flow diagram 400 for creating an isolated execution environment in accordance with various embodiments. It should be readily apparent to those of ordinary skill in the art that the flow diagram 400 depicted in FIG. 4 represents a generalized schematic illustration and that other stages can be added or existing stages can be removed or modified.

In 405, the processing can begin. In 410, the sandbox tool 110 can initiate access of the untrusted content in an isolated execution environment. The sandbox tool 110 can automatically initiate access of the untrusted content in the isolated execution environment 230. For example, upon the access of certain content, such as particular files or applications, the sandbox tool 110 can automatically initiate access of the untrusted content in the isolated execution environment 230.

Likewise, the sandbox tool 110 can initiate access of the untrusted content based on a request from the user of the user computing system 106. For example, the sandbox tool 110 can be configured to be accessed by the user and configured to allow the user to select the untrusted content 225 to be accessed in the isolated execution environment 230. For instance, the sandbox tool 110 can be directly accessed in order to initiate access of the untrusted content 225 in the isolated execution environment 230. Additionally, the sandbox tool 110 can be linked to other applications and programs (e.g. web browsers) to allow access of the untrusted content 225 in the isolated execution environment 230.

In 415, the sandbox tool 110 can create a temporary namespace for the isolated execution environment 230. For example, the sandbox tool 110 can instruct the namespace module 305 to create a temporary namespace for the isolated execution environment 230, such as a temporary home directory and tmp directory. The namespace module 205 can create the temporary namespace to model the structure of the namespace of the user execution environment 220 and can label the temporary directories with a unique name such as "sandbox_x_file.t".

In 420, the sandbox tool 110 can copy the untrusted content 225 to the temporary namespace for the isolated execution environment 230. For example, the sandbox tool 110 can copy or can instruct the secure OS 106 to copy the untrusted content 225 to the temporary home directory and tmp directory in the same location it would be found in the home directory and tmp directory of the user execution environment 220. In addition to copying the untrusted content 225, the sandbox tool 110 can copy any other necessary content (files, applications, programs) to the temporary namespace, which is required to access the untrusted content 225.

For example, if the untrusted content 225 is an untrusted file or data, the sandbox tool 110 can copy or can instruct the secure OS 106 to copy the untrusted file and/or data to the temporary home directory and tmp directory in the same location it would be found in the home directory and tmp directory of the user execution environment 220. Additionally, the sandbox tool 110 can copy or can instruct the secure OS 106 to copy any additional data, files and applications to the temporary home directory and tmp directory that are required to access the untrusted file and/or data.

In another example, if the untrusted content 225 is an untrusted program or application, the sandbox tool 110 can copy or can instruct the secure OS 106 to copy the untrusted program or application to the temporary home directory and tmp directory in the same location it would be found in the home directory and tmp directory of the user execution environment 220. Additionally, the sandbox tool 110 can copy or can instruct the secure OS 106 to copy any additional data, files and applications to the temporary home directory and tmp directory that are required to access and execute the untrusted program or application.

In 425, the sandbox tool 110 can create an execution file in the temporary namespace. The execution file can be configured to cause the untrusted content 225 to execute once the isolated execution environment 230 is completely created. For example, if the untrusted content 225 is an untrusted program or application, the execution file can cause the untrusted program or application to begin execution. Likewise, if the untrusted content 225 is an untrusted file and/or data, the execution file can cause the appropriate applications or programs to begin execution in order to view and access the untrusted data and/or files.

In 430, the sandbox tool 110 can isolate the temporary namespace for other namespaces such as the namespace of the user execution environment 220. For example, the sandbox tool 110 can instruct the namespace module 305 to unshare the namespace of the user execution environment 220 to prevent access to processes in the user execution environment 220. Then, the sandbox tool 110 can instruct the namespace module 305 to mount the temporary namespace over the namespace of the user execution environment 220, thereby preventing any access by the untrusted content 225 to the user execution environment 220.

In 435, the sandbox tool 110 can set the security context of the isolated execution environment 230. For example, the sandbox tool 110 can apply or can instruct the security module 310 to apply a security label, which identifies the security policies, to the isolated execution environment 230. The security context can be predetermined for the particular untrusted content 225 and/or selected by the user of the computing system 102.

For example, if the secure OS 106 is SELinux, the sandbox tool 110 can apply or can instruct the security module 310 to apply a MCS label, such as "MCS1", to the isolated execution environment. In embodiments, the sandbox tool 110 can be configured to create and/or maintain one or more isolated execution environments 230, simultaneously. The multiple isolated execution environments 230 can have the same security context, for example, the same levels of access to the resources of the user computing system 102. In the above example, in order to keep the multiple isolated execution environments 230 isolated from each other, the sandbox tool 110 can be configured to assign (or instruct the security module 310 to apply) different MCS labels, for example random MCS labels, to each of the multiple isolated execution environments 230. For instance, the sandbox tool 110 can assign other isolated execution environment 230 different MCS labels, such as "MCS2", "MCS3", etc. As such, the sandbox tool 110 can create one or more isolated execution environments 230 which co-exist and have the same level of access, but remain isolated from each other.

In 440, the sandbox tool 110 can create a new virtual process server for the isolated execution environment 230. For example, the sandbox tool 110 can instruct the process server module 315 to create a new virtual process server for the isolated execution environment 230. Because a security label has been applied to the isolated execution environment 230, the new virtual process server will n according to the attached security label, for example, "sandbox_xserver_t: MCS1". In 445, the sandbox tool 110 can remove any data used to create the isolated execution environment 230.

In 450, the sandbox tool 110 can instruct the new virtual process server to automatically maximize user interfaces generated by the new virtual process server. For example, if the new virtual process server is an X Windows server, the sandbox tool 110 can instruct, directly or via the process server module 315, to maximize the X windows generated by the new X Server. Because a security label has been applied to the isolated execution environment 230, the windows manager of the new virtual process server will run according to the attached security label, for example, "sandbox_x_t:MCS1".

In 455, the sandbox tool 110 can run the execution file for the untrusted content 225. As such, the untrusted content 225 will be accessed in the isolated execution environment. For example, if the untrusted content 225 is an untrusted program or application, running the execution file causes the untrusted program or application to begin execution. Likewise, if the untrusted content 225 is an untrusted file and/or data, running the execution file causes the appropriate applications or programs to begin execution in order to view and access the untrusted data and/or files. In these examples, once the untrusted applications, programs, and/or the appropriate application and programs to access the untrusted data and/or files begin execution, the new virtual process server generates user interfaces (e.g. X-Windows environment) to allow the user to interact with the application and programs.

Because a security label has been applied to the isolated execution environment 230, the untrusted content 225 and/or any other process will rim according to the attached security label, for example, "sandbox_x-client_t:MCS1". As such, the secure OS 106 will apply security policies and grant/restrict access to the resources of the user computing system 102 according to the attached security label. Likewise, the untrusted content 225 and any other process with the applied security label can only access processes with the same security label, "MCS1".

In 460, the sandbox tool 110 can optionally track malicious activity from the untrusted content 225. The sandbox tool 110 can track or instruct the security module 310 to track malicious activity from the untrusted content 225. For example, the sandbox tool 110 and/or security module 310 can monitor for requests to access resources outside the security context of the isolated execution environment. The sandbox tool 110 and/or the security module 310 can store a record of the malicious activity and/or notify the user of the malicious. Because the malicious activity is outside the security context of the isolated execution environment, the secure OS 106 can prevent the malicious activity from gaining access to the resources and processes of the user computing system 102.

In 465, the sandbox tool 110 can remove the isolated execution environment 230 after completion of the access of the untrusted content 225. For instance, the sandbox tool 110 can begin removal of the isolated execution environment 230 once the untrusted applications, programs, and/or the appropriate application and programs to access the untrusted data and/or files are closed. For example, to remove the isolated execution environment, the sandbox tool 110 can stop or instruct the processor server module 315 to stop the new virtual process server associated with the isolated execution environment 230. Likewise, the sandbox tool 110 can delete or instruct the namespace module 305 to delete the temporary namespace (e.g. delete the temporary home directory and tmp directory). Additionally, the sandbox tool 110 can mount or instruct the namespace 305 to mount the home directory and tmp directory of the user execution environment 220. In 470, the processing can end, repeat or return to any point.

Figure 5A:
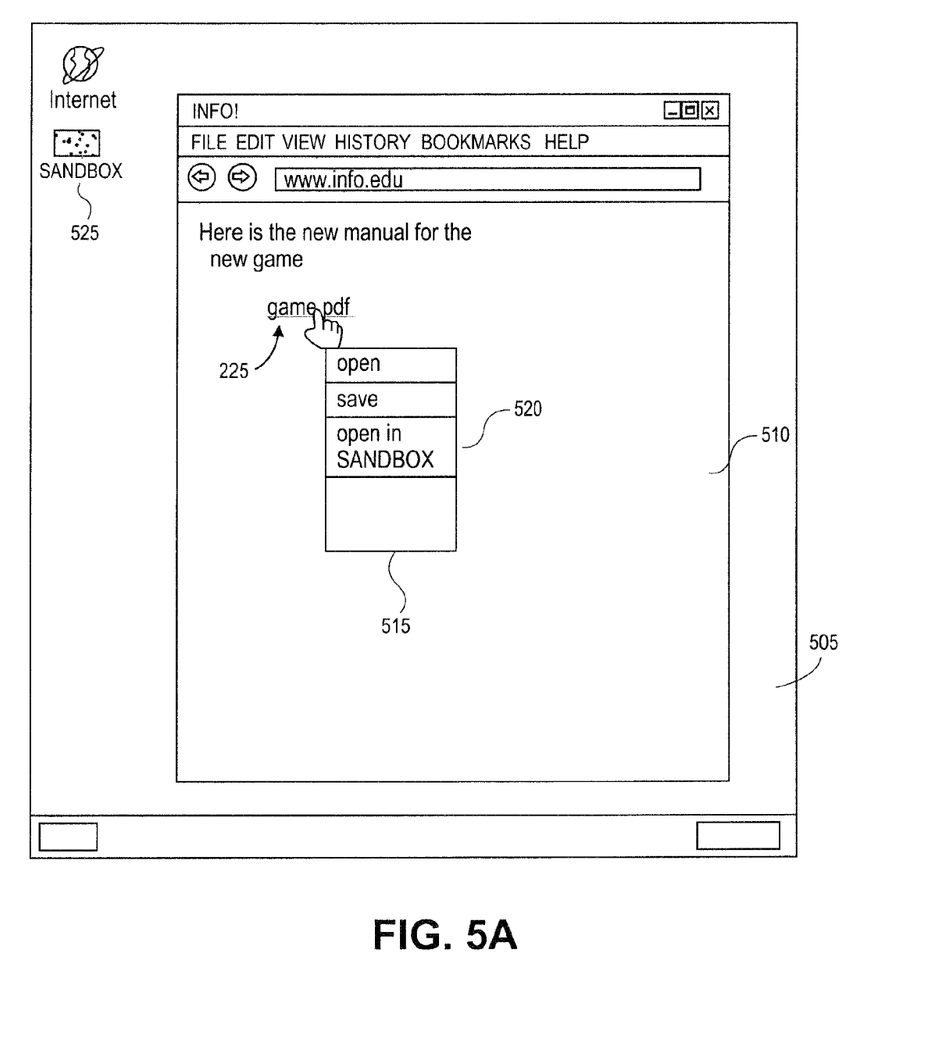
FIGS. 5A and 5B illustrate exemplary interfaces for accessing untrusted content in the isolated execution environment, according to various embodiments.
Figure 5B:
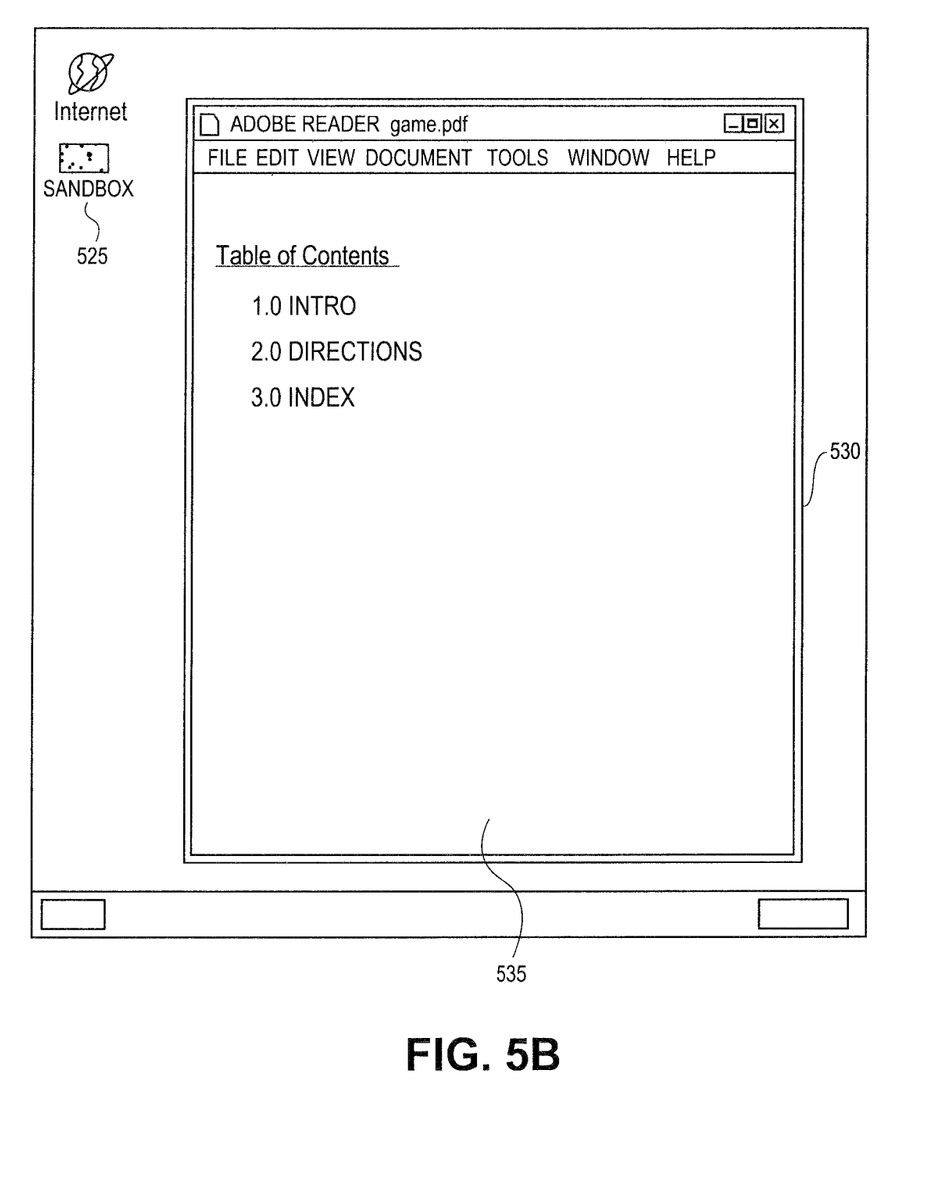

As mentioned above, the sandbox tool 110 can be accessed directly or via other programs in order to initiate access of content in the isolated execution environment 230. FIGS. 5A and 5B are exemplary screen shots of various methods and processes of initiating the sandbox tool 110, and resulting exemplary interface for the isolated execution environment 230. As illustrated in FIG. 5A, the secure OS 106, running on the user computing system 102, can provide the user execution environment 505, such as an X Windows interfaces, that allows a user to run applications and programs, view files and data, and communicate with the remote computing systems 104.

In one exemplary embodiment, a user can execute a program such as a web browser, in order to communicate with the remote computing systems 104. As illustrated, the user can access the web browser through an interface 510. The user can desire to access the untrusted content 225, such as an ADOBE pdf file "game.pdf". Because the user may not know the source of the untrusted content 225, the user can desire to isolate the user computing system 102 for the untrusted content 225. In one exemplary embodiments, the sandbox tool 110 can be configured to generate a selection 520 in a menu 515 that allows the user to initiate the sandbox tool 110 in order to access the untrusted content 225 in the isolated execution environment unit 230. When the user selects the untrusted content 225, the menu 515 can be presented to the user, which allows the user to initiate the sandbox tool 110.

In another exemplary embodiment, in order to initiate the sandbox tool 110, the user can directly access the sandbox tool 110. As illustrated in FIG. 5A, the sandbox tool 110 can be configured to provide a icon or link 525 that causes the sandbox tool 110 to initiate. In order to initiate the sandbox tool 110, the user can select the icon or link 525. Once initiated, the sandbox tool 110 can provide GUIs that allow the user to select the untrusted content 225 to access in the isolated execution environment 230, and select a security context to apply to the isolated execution environment 230.

As illustrated in FIG. 5B, once the sandbox tool 110 has created the isolated execution environment 230 and the execution file is run, the new virtual process server can create a new interface 530 for displaying the interface 535 for the application (e.g. ADOBE READER) to access the untrusted content 225. As such, the user can access the untrusted content 225 in the isolated execution environment 230.

Figure 6:
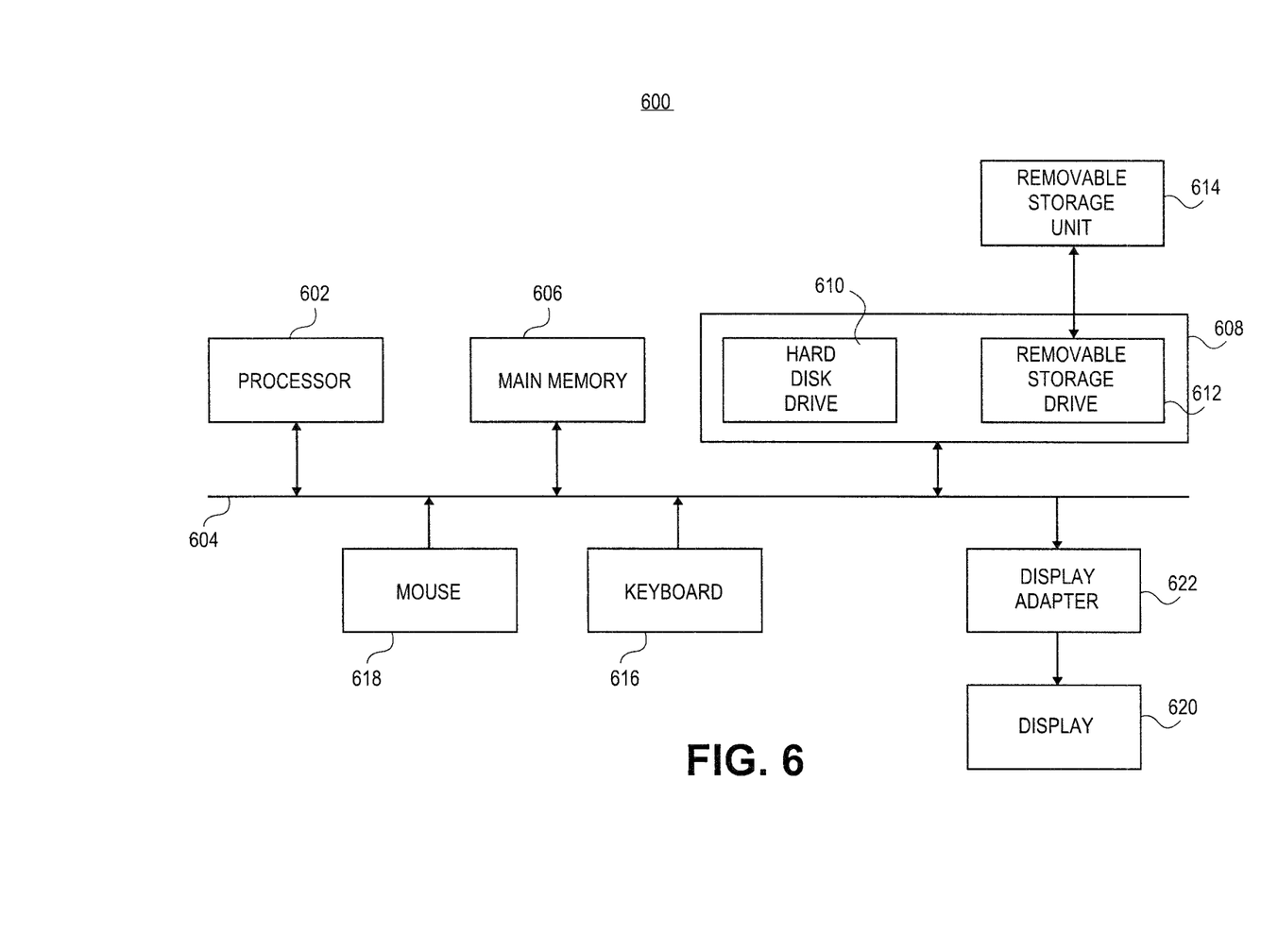
FIG. 6 illustrates an exemplary computing system which can implement the secure operating system and the sandbox tool, according to various embodiments.

FIG. 6 illustrates an exemplary block diagram of a computing system 600 which can be implemented as user computing system 102 and/or the remote computing systems 104 according to various embodiments. The functions of the secure OS 106 and the sandbox tool 110 can be implemented in program code and executed by the computing system 600.

As shown in FIG. 6, the computing system 600 includes one or more processors, such as processor 602 that provide an execution platform for embodiments of the guest account module 125. Commands and data from the processor 602 are communicated over a communication bus 604. The computing system 600 also includes a main memory 606, for example, one or more computer readable storage media such as a Random Access Memory (RAM), where the secure OS 106 and the sandbox module 110 can be executed during runtime, and a secondary memory 608. The secondary memory 608 includes, for example, one or more computer readable storage media such as a hard disk drive 610 and/or a removable storage drive 612, representing a floppy diskette drive, a magnetic tape drive, a compact disk drive, etc., where a copy of a computer application program embodiment for the secure OS 106 and the sandbox tool 110 can be stored. The removable storage drive 612 reads from and/or writes to a removable storage unit 614 in a well-known manner. A user can interfaces with the secure OS 106 and the sandbox tool 110 with a keyboard 616, a mouse 618, and a display 620. The display adapter 622 interfaces with the communication bus 604 and the display 620. The display adapter 622 also receives display data from the processor 602 and converts the display data into display commands for the display 620.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   receiving a request to access untrusted content within a user namespace of a user execution environment on a computing system;
   creating, by a processor in response to receiving the request to access the untrusted content, an isolated execution environment on the computing system, wherein creating the isolated execution environment comprises generating a temporary namespace for the isolated execution environment, copying the untrusted content from the user namespace to the temporary namespace, and isolating the temporary namespace from the user namespace after copying the untrusted content from the user namespace to the temporary namespace;
   initiating access of the untrusted content within the isolated execution environment after isolating the temporary namespace from the user namespace;
   tracking the access of the untrusted content within the isolated execution environment for malicious activity; and removing the isolated execution environment after the access of the untrusted content.

2. The method of claim 1, wherein creating the isolated execution environment comprises applying a security context to the isolated execution environment.

3. The method of claim 2, further comprising receiving a selection of the security context to apply to the isolated execution environment.

4. The method of claim 1, wherein the temporary namespace comprises a temporary file directory and the user namespace comprises a user file directory, wherein copying the untrusted content comprises copying a directory structure from a location in the user file directory to a corresponding location the temporary file directory, and wherein isolating the temporary namespace comprises unsharing the user namespace from the temporary execution environment and mounting the temporary namespace over the user namespace to prevent access from the temporary namespace to the user namespace.

5. The method of claim 4, further comprising labeling the temporary file directory with a name that is different than a name of the user file directory.

6. The method of claim 1, wherein creating the isolated execution environment comprises starting a first virtual process server for the isolated execution environment, and wherein the first virtual process server is separate from a second virtual process server for the user execution environment.

7. The method of claim 6, wherein removing the isolated execution environment comprises terminating the first virtual process server for the isolated execution environment.

8. The method of claim 1, wherein removing the isolated execution environment comprises removing the temporary namespace for the isolated execution environment.

9. The method of claim 1, wherein the untrusted content comprises at least one of an application or a file.

10. A non-transitory computer readable storage medium comprising instructions which, when executed by a processor, cause the processor to perform operations comprising:
receiving a request to access untrusted content within a user namespace of a user execution environment on a computing system;
creating, by the processor in response to receiving the request to access the untrusted content, an isolated execution environment on the computing system, wherein creating the isolated execution environment comprises generating a temporary namespace for the isolated execution environment, copying the untrusted content from the user namespace to the temporary namespace, and isolating the temporary namespace from the user namespace after copying the untrusted content from the user namespace to the temporary namespace;
initiating access of the untrusted content within the isolated execution environment after isolating the temporary namespace from the user namespace;
tracking the access of the untrusted content within the isolated execution environment for malicious activity; and
removing the isolated execution environment after the access of the untrusted content.

11. The non-transitory computer readable storage medium of claim 10, wherein creating the isolated execution environment comprises applying a security context to the isolated execution environment.

12. The non-transitory computer readable storage medium of claim 11, wherein the operations further comprise receiving a selection of the security context to apply to the isolated execution environment.

13. The non-transitory computer readable storage medium of claim 10, wherein the temporary namespace comprises a temporary file directory and the user namespace comprises a user file directory, wherein copying the untrusted content comprises copying a directory structure from a location in the user file directory to a corresponding location the temporary file directory, and wherein isolating the temporary namespace comprises unsharing the user namespace from the temporary execution environment and mounting the temporary namespace over the user namespace to prevent access from the temporary namespace to the user namespace.

14. The non-transitory computer readable storage medium of claim 13, further comprising labeling the temporary file directory with a name that is different than a name of the user file directory.

15. The non-transitory computer readable storage medium of claim 10, wherein creating the isolated execution environment comprises starting a first virtual process server for the isolated execution environment, and wherein the first virtual process server is separate from a second virtual process server for the user execution environment.

16. The non-transitory computer readable storage medium of claim 15, wherein removing the isolated execution environment comprises terminating the first virtual process server for the isolated execution environment.

17. The non-transitory computer readable storage medium of claim 10, wherein removing the isolated execution environment comprises removing the temporary namespace for the isolated execution environment.

18. The non-transitory computer readable storage medium of claim 10, wherein the untrusted content comprises at least one of an application or a file.

19. The method of claim 1, wherein creating the isolated execution environment comprises instructing an operating system of the computing system to create the isolated execution environment, and wherein removing the isolated execution environment comprises instructing the operating system to remove the isolated execution environment.

20. The method of claim 1, wherein the isolated execution environment has limited access to resources of the computing system.

21. The method of claim 1, wherein creating the isolated execution environment comprises creating the isolated execution environment further in response to a determination that the untrusted content is untrusted.

22. The non-transitory computer readable storage medium of claim 10, wherein the isolated execution environment has limited access to resources of the computing system.

23. The non-transitory computer readable storage medium of claim 10, wherein creating the isolated execution environment comprises creating the isolated execution environment further in response to a determination that the untrusted content is untrusted.

24. A system comprising:
a memory to store untrusted content;
a processor, coupled to the memory, to:
receive a request to access the untrusted content within a user namespace of a user execution environment on a computing system;
create, in response to receiving the request to access the untrusted content, an isolated execution environment on the computing system, wherein the processor is to create the isolated execution environment by generation of a temporary namespace for the isolated execution environment, duplication of the untrusted content from the user namespace to the temporary namespace, and isolation of the temporary namespace from the user namespace after the duplication of the untrusted content from the user namespace to the temporary namespace;

initiate access of the untrusted content within the isolated execution environment after the isolation of the temporary namespace from the user namespace;

track the access of the untrusted content within the isolated execution environment for malicious activity; and remove the isolated execution environment after the access of the untrusted content.

25. The system of claim 24, wherein the processor is to create the isolated execution environment further in response to a determination that the untrusted content is untrusted.

* * * * *